(12) United States Patent
Kusumi et al.

(10) Patent No.: US 10,195,929 B2
(45) Date of Patent: Feb. 5, 2019

(54) ELECTRICALLY-DRIVEN VEHICLE

(71) Applicants: TOYOTA JIDOSHA KABUSHIKI KAISHA, Toyota-shi, Aichi-ken (JP); KABUSHIKI KAISHA TOYOTA JIDOSHOKKI, Kariya-shi, Aichi (JP)

(72) Inventors: Hidetoshi Kusumi, Nagoya (JP); Ikkei Ohgitani, Obu (JP)

(73) Assignees: TOYOTA JIDOSHA KABUSHIKI KAISHA, Toyota-shi, Aichi-ken (JP); KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/809,096

(22) Filed: Nov. 10, 2017

(65) Prior Publication Data

US 2018/0065463 A1   Mar. 8, 2018

Related U.S. Application Data

(63) Continuation of application No. 15/161,865, filed on May 23, 2016, now Pat. No. 9,840,137.

(30) Foreign Application Priority Data

May 25, 2015   (JP) ................................. 2015-105809

(51) Int. Cl.
*B60K 1/04*   (2006.01)
*B60L 11/18*   (2006.01)
(Continued)

(52) U.S. Cl.
CPC ................. *B60K 1/04* (2013.01); *B60K 6/28* (2013.01); *B60K 6/44* (2013.01); *B60K 6/448* (2013.01); *B60L 11/1818* (2013.01); *B60L 11/1861* (2013.01); *B60L 11/1868* (2013.01); *B60L 11/1874* (2013.01); *B60K 2001/005* (2013.01);
(Continued)

(58) Field of Classification Search
CPC .............. B60L 11/1877; B60L 11/1851; B60L 11/1853; H01M 2/1077; H01M 2/1083; B60K 2001/0438
See application file for complete search history.

(56) References Cited

U.S. PATENT DOCUMENTS 9,136,783 B2   9/2015   Mitsutani
9,166,515 B2   10/2015  Kaita et al.
(Continued)

FOREIGN PATENT DOCUMENTS

CN   102438863 A   5/2012
CN   102887054 A   1/2013
(Continued)

*Primary Examiner* — Brian L Swenson
(74) *Attorney, Agent, or Firm* — Sughrue Mion, PLLC

(57) ABSTRACT

An electrically-driven vehicle includes a high-capacity battery unit and a high-output battery unit, both of which supply electric power to rotating electric machines, and a charging inlet serving as a charging port of an external power supply. The high-capacity battery unit receives more charge power from the charging inlet than the high-output battery unit and is positioned nearer to the charging inlet than the high-output battery unit is to the charging inlet. In this way, an electric power loss increase caused by a wiring resistance during an external charge can be suppressed in a plug-in type electrically-driven vehicle, which is chargeable by an external power supply.

2 Claims, 7 Drawing Sheets

(51) Int. Cl.
*B60K 6/44* (2007.10)
*B60K 6/28* (2007.10)
*B60K 6/448* (2007.10)
*B60K 1/00* (2006.01)

(52) U.S. Cl.
CPC ..... *B60K 2001/0438* (2013.01); *Y02T 10/623* (2013.01); *Y02T 10/6243* (2013.01); *Y02T 10/7005* (2013.01); *Y10S 903/907* (2013.01)

(56) References Cited

U.S. PATENT DOCUMENTS

| | | |
|---|---|---|
| 9,254,751 B2 | 2/2016 | Yamashita et al. |
| 2012/0025744 A1 | 2/2012 | Kim et al. |
| 2012/0055724 A1 | 3/2012 | Iwasa et al. |
| 2013/0020139 A1 | 1/2013 | Kim et al. |
| 2013/0162208 A1 | 6/2013 | Ohnuki |
| 2014/0196964 A1 | 7/2014 | Hayashi et al. |
| 2015/0084412 A1 | 3/2015 | Matano et al. |
| 2015/0097425 A1 | 4/2015 | Kimura et al. |
| 2015/0183325 A1 | 7/2015 | Mitsutani |
| 2015/0331472 A1 | 11/2015 | Iwamoto et al. |

FOREIGN PATENT DOCUMENTS

| | | |
|---|---|---|
| JP | 2013-247774 A | 12/2013 |
| WO | 2013030884 A1 | 3/2013 |
| WO | 2013/157049 A1 | 10/2013 |

ELECTRICALLY-DRIVEN VEHICLE

PRIORITY INFORMATION

This application is a continuation application of U.S. patent application Ser. No. 15/161,865 filed May 23, 2016, which claims priority to Japanese Patent Application No. 2015-105809, filed on May 25, 2015, which is incorporated herein by reference in its entirety.

FIELD

The present invention relates to an electrically-driven vehicle using a rotating electric machine as a drive source.

BACKGROUND

Electrically-driven vehicles using rotating electric machines as drive sources, such as hybrid vehicles and electric cars, are mounted with DC power supplies. For example, International Publication No. WO 2013/157049 discloses a hybrid vehicle including a high-output battery unit having a relatively high output (W) and a high-capacity battery unit having a relatively high capacity (Ah).

In an electric vehicle (EV) drive mode in which a vehicle is driven solely by a rotating electric machine, electric power is supplied mainly from the high-capacity battery unit to the rotating electric machine. When an output request exceeding the maximum output of the high-capacity battery unit is received, electric power is supplied from the high-output battery unit in place of the high-capacity battery unit.

In order to charge these battery units, "external charge" by an external power supply is performed in so-calledplug-in hybrid vehicles. Such a vehicle is provided with a connector (charging port) called a "charging inlet" for connecting an external power supply.

The charging inlet may be positioned at a rear side of a vehicle. International Publication No. WO 2013/157049 describes that the high-capacity battery unit and the high-output battery unit are provided in a luggage space at a rear side of the vehicle. By providing all of the charging inlet, the high-capacity battery unit, and the high-output battery unit near to each other at a rear side of the vehicle, wiring resistance in external charge components can be suppressed.

SUMMARY

In order to extend the cruising range in the EV drive mode, a larger battery unit is necessary. However, if a battery unit is too large, the high-capacity battery unit and the high-output battery unit cannot be placed near to the charging inlet due to limitations of a vehicle layout. Thus, the wiring resistances between each battery unit and a charging inlet are increased. A larger wiring resistance causes a larger power loss during external charging. Accordingly, the present invention has an object to provide an electrically-driven vehicle which can suppress an increase of a power loss during external charging by an arrangement of the battery units.

An electrically-driven vehicle according to an embodiment of the present invention includes a rotating electric machine for driving the vehicle, a high-capacity battery unit having a relatively high capacity and a high-output battery unit having a relatively high output, both of which supply electric power to the rotating electric machine, and a charging inlet serving as a charging port of an external power supply. The high-capacity battery unit receives more charge power from the charging inlet than the high-output battery unit receives and is positioned nearer to the charging inlet than the high-output battery unit is to the charging inlet.

An electrically-driven vehicle according to another embodiment of the present invention includes a rotating electric machine for driving the vehicle, and a high-capacity battery unit having a relatively high capacity and a high-output battery unit having a relatively high output, both of which supply electric power to the rotating electric machine, and a charging inlet serving as a charging port of an external power supply. The charging inlet is connected to the high-capacity battery unit via first power wiring and also to the high-output battery unit via second power wiring. The first power wiring is shorter than the second power wiring.

It is preferable that, in the invention described above, among the electric power supplied to the rotating electric machine, a ratio of the electric power supplied from the high-capacity battery unit to the rotating electric machine is higher than a ratio of the electric power supplied from the high-output battery unit to the rotating electric machine.

It is further preferable that, in the invention described above, the high-capacity battery unit and the high-output battery unit are enclosed in a single case positioned under a floor panel.

It is further preferable that, in the invention described above, the electrically-driven vehicle further includes a cooling fan which supplies cooling air to the high-capacity battery unit, and the cooling fan is positioned under a rear seat of the vehicle.

According to the present invention, the battery units can be arranged such that an increase in power loss during external charging can be suppressed.

BRIEF DESCRIPTION OF THE DRAWINGS

The present invention will be further described with reference to the following accompanying drawings, wherein like reference numerals refer to like parts in the several views.

DESCRIPTION OF THE EMBODIMENTS

<Overall Configuration>

Figure 1:
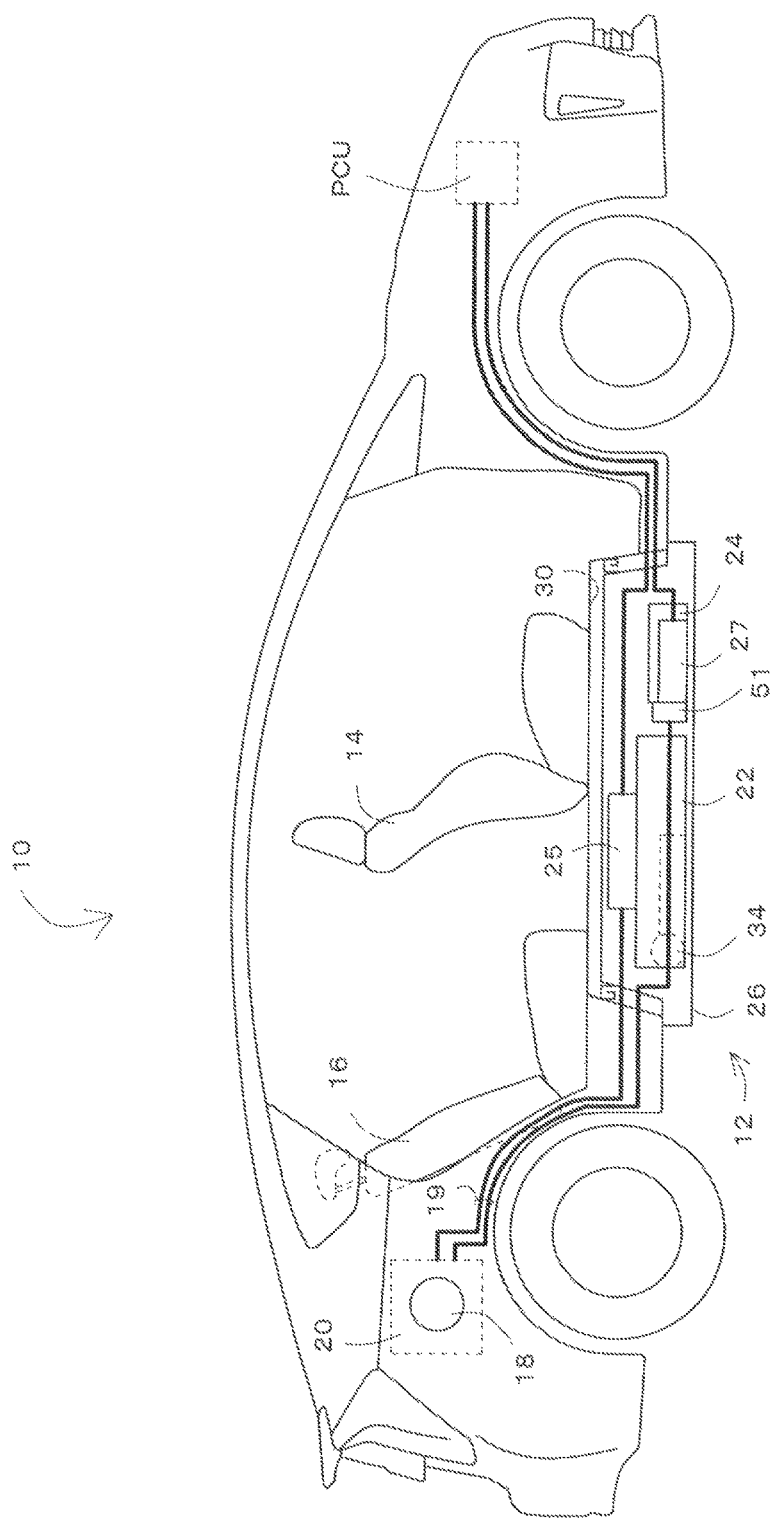
FIG. 1 shows an example of a side view of an electrically-driven vehicle according to a first embodiment of the present invention.
Figure 2:
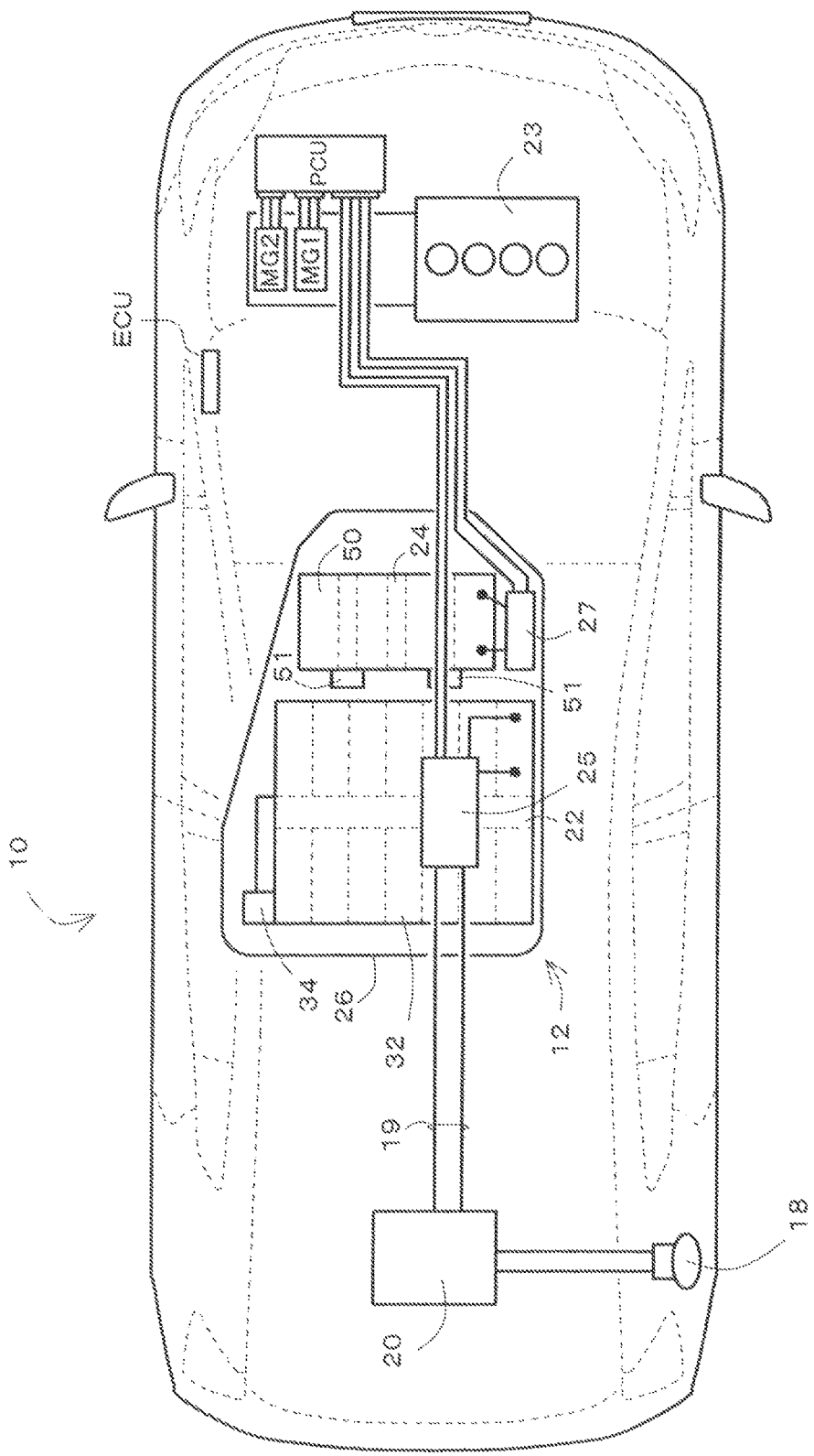
FIG. 2 shows an example of a plan view of an electrically-driven vehicle according to the first embodiment of the present invention.

FIGS. 1 and 2 show an example of an electrically-driven vehicle 10 according to an embodiment of the present invention. Specifically, FIG. 1 shows a side view of the electrically-driven vehicle 10 and FIG. 2 shows a plan view of the electrically-driven 10. It should be noted that in order to clarify the positional relationship between a battery pack 12 and a front seat 14, and between the battery pack battery pack 12 and a rear seat 16, some elements such as a door and a center pillar are omitted in the drawings.

The electrically-driven vehicle 10 includes a charging inlet 18, a battery charger 20, the battery pack 12, a power control unit PCU, a first rotating electric machine MG1, a second rotating electric machine MG2, an internal combustion engine 23, and a controller ECU. The electrically-driven vehicle 10 shown as an example in FIGS. 1 and 2 is a hybrid vehicle which uses the first and second rotating electric machines MG1 and MG2 and the internal combustion engine 23 as drive sources.

In the EV drive mode in which the electrically-driven vehicle 10 is driven solely by the second rotating electric machine MG2, electric power is supplied to the second rotating electric machine MG2 mainly from a high-capacity battery unit 22 of the battery pack 12. When an output request exceeding the maximum output (W) of the high-capacity battery unit 22 is received, electric power is supplied to the second rotating electric machine MG2 from a high-output battery unit 24 of the battery pack 12 in place of the high-capacity battery unit 22.

Further, when the state of charge (SOC) of the high-capacity battery unit 22 or the high-output battery unit 24 decreases to a predetermined value, the mode is switched from the EV mode to a HV mode in which the electrically-driven vehicle 10 is driven by a combination of the second rotating electric machine MG2 and the internal combustion engine 23. The drive force of the internal combustion engine 23 is divided between the drive wheels and the first rotating electric machine MG1 so as to use the first rotating electric machine MG1 for both driving and power generation. The electric power generated by the first rotating electric machine MG1 is partially distributed to the second rotating electric machine MG2 such that the drive force of the second rotating electric machine MG2 is transmitted to the drive wheels. Further, the remaining power generated by the first rotating electric machine MG1 is partially supplied to the high-capacity battery unit 22 and the high-output battery unit 24.

Further, in a vehicle braking operation, regenerative braking is performed by the second rotating electric machine MG2. The regenerated power obtained during this operation is supplied to the high-capacity battery unit 22 and the high-output battery unit 24.

Further, the electrically-driven vehicle 10 is configured as a so-called plug-in vehicle, which is externally chargeable (external charge) from an external power supply (not shown). The electrically-driven vehicle 10 is provided with the charging inlet 18 serving as a charging port of an external power supply (not shown).

As described below, the high-capacity battery unit 22 is configured to receive more charge power from the charging inlet 18 than the high-output battery unit 24 receives. Additionally, in the present embodiment, the high-capacity battery unit 22 is positioned relatively near to the charging inlet 18. Specifically, the high-capacity battery unit 22 is positioned nearer to the charging inlet 18 than the high-output battery unit 24 is to the charging inlet 18. Such an arrangement can make the wiring between the high-capacity battery unit 22 and the charging inlet 18 shorter. Accordingly, increase in power loss caused by a wiring resistance during external charging can be suppressed.

<Details of Each Element>

The charging inlet 18 is a charging port of an external power supply. The charging inlet 18 is also called an "electric vehicle charge cable". The charging inlet 18 includes, for example, a female connector which is connected to a male connector of a charge cable connected to the external power supply. The charging inlet 18 is further connected to the high-capacity battery unit 22 of the battery pack 12 via a charging wiring 19. In the example shown in FIGS. 1 and 2, the charging inlet 18 is provided at the rear right side of the vehicle.

The battery charger 20 is also called an "EV charger". The battery charger 20 is connected between the charging inlet 18 and the battery pack 12. The battery charger 20 includes, for example, a power factor correction circuit (PFC) and a DC-DC converter (both not shown). The AC power supplied from a household power supply (for example, AC 100 V or 200 V) which is an external power supply is converted to DC power by the power factor correction circuit. The converted DC power is supplied to the battery pack 12 after being boosted by a DC-DC converter.

The battery pack 12 includes a case 26, the high-capacity battery unit 22, the high-output battery unit 24, a first junction block 25, a second junction block 27, a first cooling fan 34, and a second cooling fan 51.

As shown in FIG. 1, the battery pack 12 is positioned under a floor panel 30 of the electrically-driven vehicle 10. By positioning the high-capacity battery unit 22 and the high-output battery unit 24, both of which are relatively heavy among the elements of the electrically-driven vehicle 10, under the floor panel 30, the electrically-driven vehicle 10 can achieve stable driving because of the low center of gravity.

The case 26 which is a protection member for the high-capacity battery unit 22 and the high-output battery unit 24 is positioned under the floor panel 30. Because the high-capacity battery unit 22 and the high-output battery unit 24 can both be enclosed in the single case 26, the high-capacity battery unit 22 and the high-output battery unit 24 can be attached and detached together.

The first cooling fan 34 supplies cooling air to each of battery modules 32 of the high-capacity battery unit 22. As shown in FIG. 1, the first cooling fan 34 is positioned under the rear seat 16 of the electrically-driven vehicle 10. As described above, the high-capacity battery unit 22 supplies electric power in the EV mode which is a relatively noiseless mode, driving solely by the second rotating electric machine MG2 (without driving the internal combustion engine 23). Because the temperature of the high-capacity battery unit 22 rises during supply of power, the first cooling fan 34 is accordingly driven. In driving the first cooling fan 34 in a relatively noiseless environment such as in the EV drive mode, discomfort of the driver in the front seat caused by the driving noise of the first cooling fan 34 or the like can be reduced by positioning the first cooling fan 34 apart from the front seat.

The second cooling fan 51 supplies cooling air to battery stacks 50 of the high-output battery unit 24. As shown in FIG. 1, the second cooling fan 51 is positioned under the front seat 14. As described above, the high-output battery unit 24 is used as an auxiliary for the high-capacity battery unit 22 in the EV drive mode. Accordingly, the second cooling fan 51 is not frequently used in the EV drive mode. Therefore, although the second cooling fan 51 is positioned under the front seat, the second cooling fan 51 causes almost no discomfort to the driver or other passengers.

The first junction block 25 is a connection member which connects/disconnects between the high-capacity battery unit 22 and the battery charger 20 and between the high-capacity battery unit 22 and the power control unit PCU. The first junction block 25 is shown as an example on the top in FIG. 3. The first junction block 25 includes a system main relay SMR1 and a charging relay CHR.

The system main relay SMR1 connects/disconnects between the high-capacity battery unit 22 and the power control unit PCU. The system main relay SMR1 includes a positive side relay SMRB1 at a high potential side (positive side) and a negative side relay SMRG1 at a low potential side (negative side). Further, in parallel to the negative side relay SMRG1, a precharge relay SMRP1 is connected. The precharge relay SMRP1 is connected to a resistor RR1. The precharge relay SMRP1 and the resistor RR1 are used to prevent inrush current generated when the high-capacity battery unit 22 and the power control unit PCU is connected to the circuit.

The charging relay CHR connects/disconnects between the high-capacity battery unit 22 and the battery charger 20. The charging relay CHR includes a positive side relay CHRB at a high potential side (positive side) and a negative side relay CHRG at a low potential side (negative side).

Figure 3:
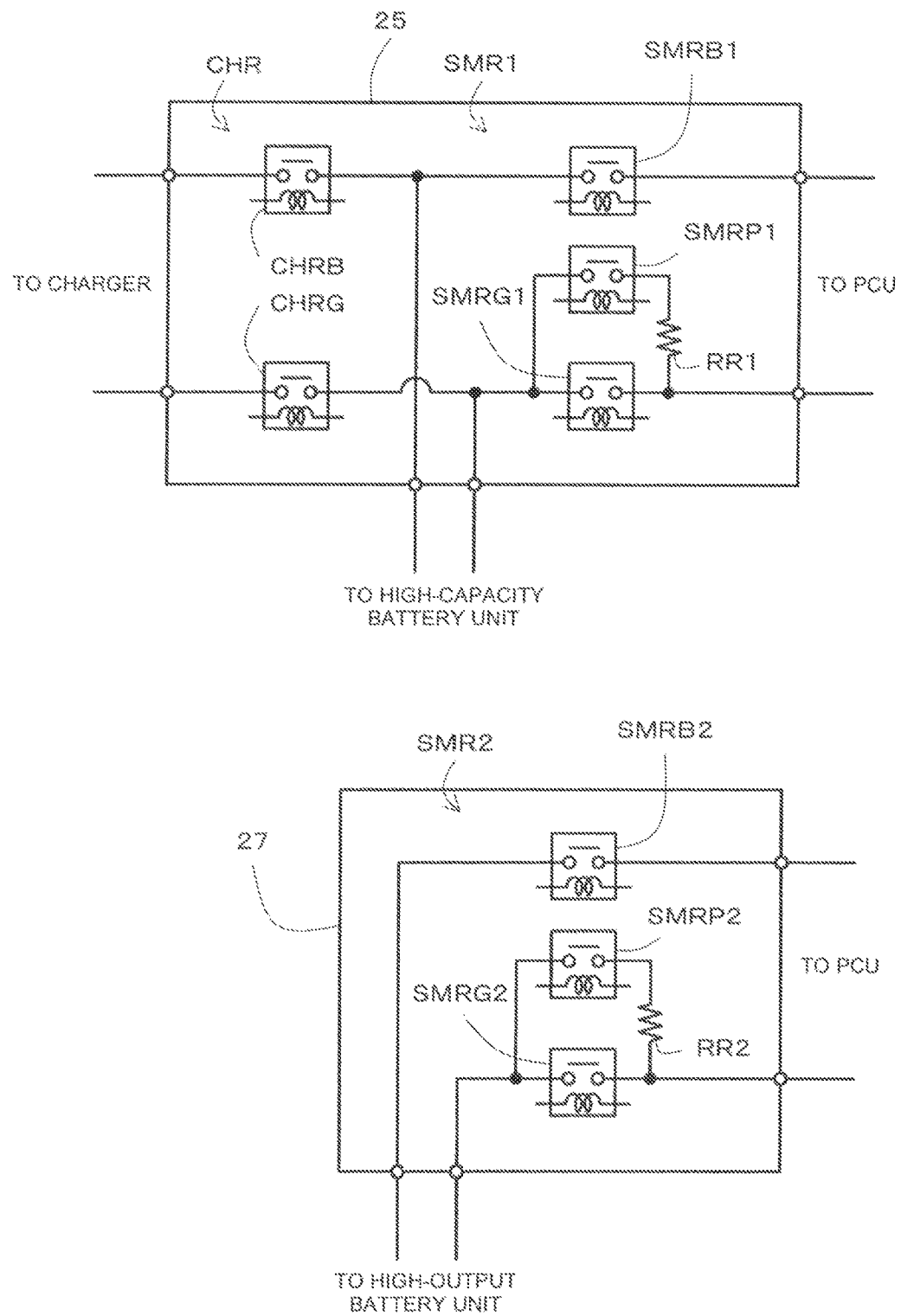
FIG. 3 shows examples of a first junction block and a second junction block which connect/disconnect each battery unit to a charging inlet and a power control unit.

The second junction block 27 is shown as an example on the bottom in FIG. 3. As described above, in the embodiment shown in FIGS. 1 and 2, the high-output battery unit 24 includes no wiring which directly connects to the charging inlet 18 and the battery charger 20 but includes wiring to connect only to the power control unit PCU. Accordingly, the second junction block 27 is provided solely with a system main relay SMR2 which is used to connect to the power control unit PCU.

Similarly to the system main relay SMR1 of the first junction block 25, the system main relay SMR2 includes a positive side relay SMRB2 at a high potential side (positive side) and a negative side relay SMRG2 at a low potential side (negative side). Further, in parallel to the negative side relay SMRG2, a precharge relay SMRP2 is connected. The precharge relay SMRP2 is connected to a resistor RR2.

Figure 4:
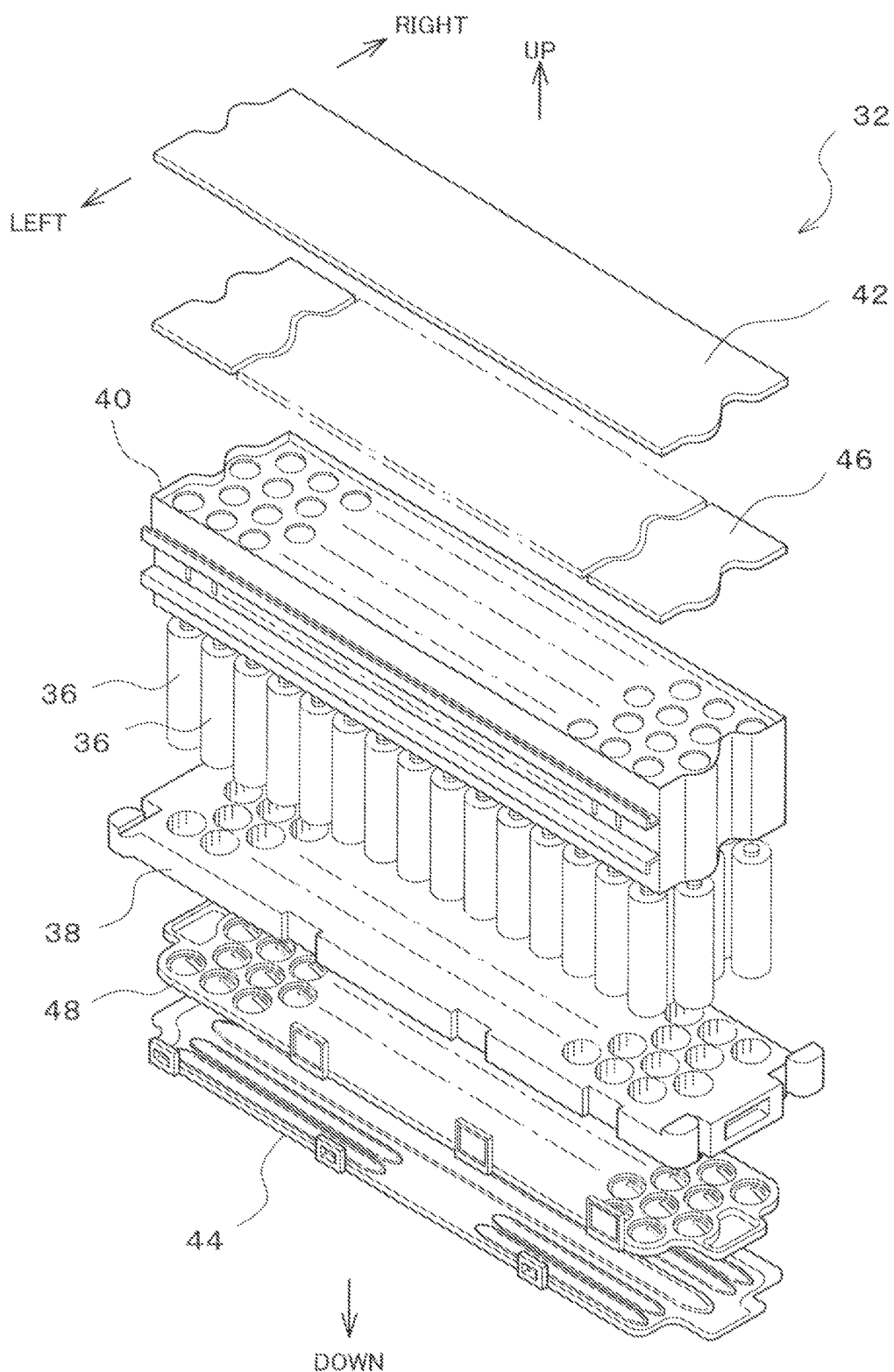
FIG. 4 shows an example of a perspective diagram of a battery module of a high-capacity battery unit.

The high-capacity battery unit 22 includes two or more battery modules 32. FIG. 4 shows an example of the battery module 32. Each battery module 32 includes two or more cylindrical batteries 36, and a positive bus bar assembly 46 and a negative bus bar assembly 48 for connecting the cylindrical batteries 36.

The cylindrical batteries 36 are secondary batteries, which are chargeable and dischargeable, for example, nickel hydride batteries and lithium ion batteries enclosed in cylindrical containers. As an example, the cylindrical batteries 36 are 18650-type lithium ion batteries.

The cylindrical batteries 36 are enclosed in a resin cover 40 having holes on a top surface. Through the holes, positive electrodes of the cylindrical batteries 36 protrude. A positive bus bar assembly 46 is attached to the protruding electrodes.

The positive bus bar assembly 46 includes a conductive body divided into two or more portions which are insulated from each other. Accordingly, by attaching the positive bus bar assembly 46 to the positive electrodes of the cylindrical batteries 36, the positive electrodes are divided into some groups which are connected in parallel to each other.

The negative ends of the cylindrical batteries 36 are respectively inserted into holes of a heat dissipating plate 38. A negative bus bar assembly 48 is attached to the negative electrodes of the cylindrical batteries 36 protruding through the holes.

Similarly to the positive bus bar assembly 46, the negative bus bar assembly 48 includes a conductive body divided into two or more portions which are insulated from each other. Accordingly, by attaching the negative bus bar assembly 48 to the negative electrodes of the cylindrical batteries 36, the negative electrodes are divided into some groups which are connected in parallel to each other.

The cylindrical batteries 36 are divided into two or more groups which are connected in parallel to each other by the positive bus bar assembly 46 and the negative bus bar assembly 48. Further, these groups are connected in series by a connection bus bar (not shown).

Figure 5:
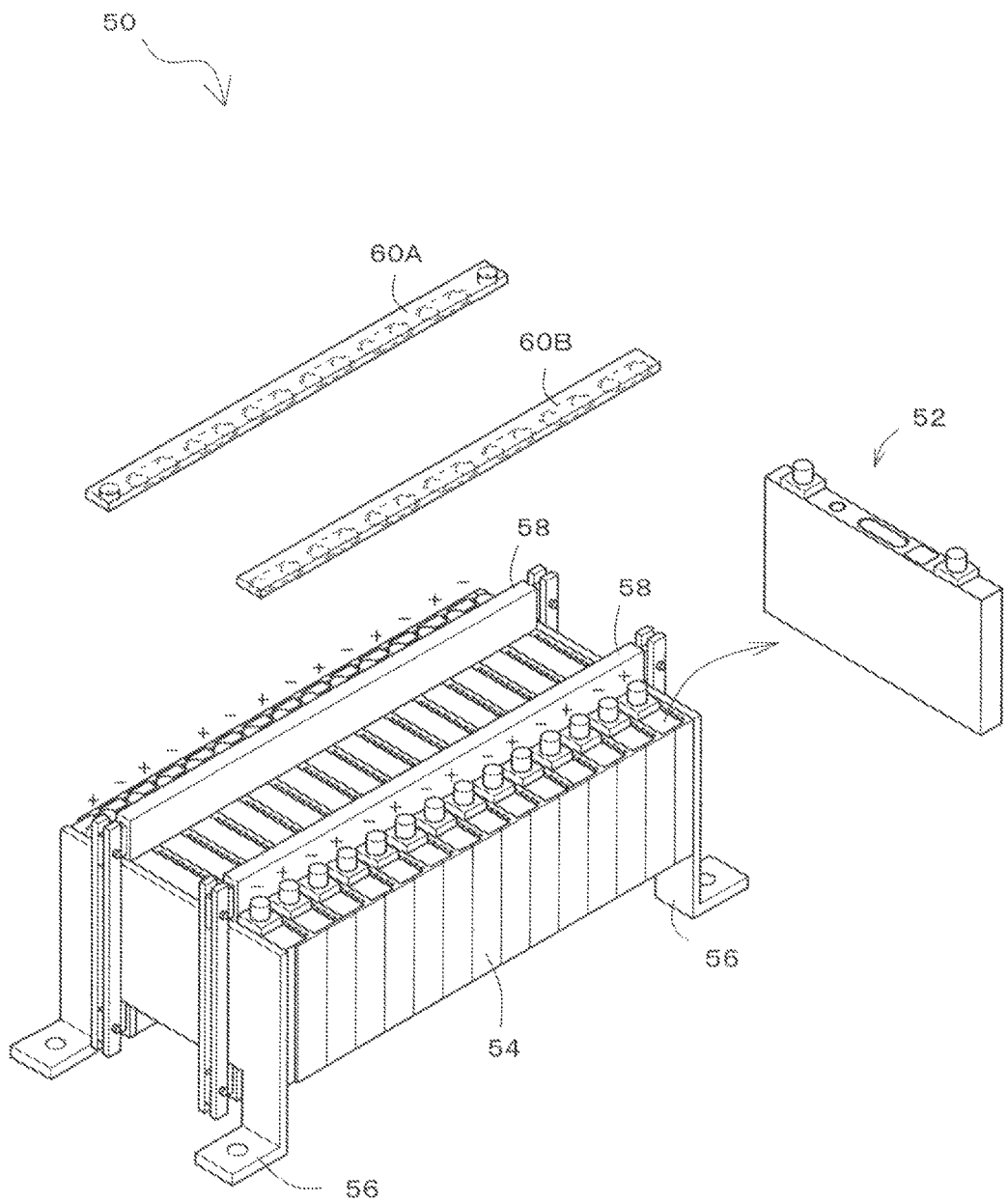
FIG. 5 shows an example of a perspective diagram of a battery stack of a high-output battery unit.

The high-output battery unit 24 includes two or more battery stacks 50. FIG. 5 shows an example of each battery stack 50. Each battery stack 50 is configured to include two or more rectangular batteries 52 stacked therein. Each of the battery stacks 50 further includes a ventilation spacer 54 inserted between the rectangular batteries 52, end plates 56 disposed at both ends of the battery stacks 50, a binding band 58 which binds these stacked elements, and bus bars 60A, 60B.

The rectangular batteries 52 are secondary batteries such as lithium ion batteries and nickel hydride batteries. The rectangular batteries 52 are stacked such that the positive electrodes and the negative electrodes are alternatively arranged. The bus bars 60A, 60B are arranged along the stacking direction of the rectangular batteries 52 to connect the positive electrodes and the negative electrodes of the rectangular batteries 52. The rectangular batteries 52 are connected in series by the bus bars 60A, 60B. By connecting the battery stacks 50 to each other in series, assembled batteries are formed such that rectangular batteries 52 are connected in series.

The characteristics of the high-capacity battery unit 22 and the high-output battery unit 24 are compared below. The cylindrical batteries 36 or the rectangular batteries 52 are connected such that, between these two battery units, the high-capacity battery unit 22 has a higher capacity (Ah) and the high-output battery unit 24 has a higher output (W).

Specifically, the high-capacity battery unit 22 is configured to have an energy density higher than the high-output battery unit 24. The energy density can be expressed as, for example, energy per unit weight (Wh/kg) of each battery unit and energy per unit volume of each battery unit (Wh/$m^3$). In other words, when the high-capacity battery unit 22 and the high-output battery unit 24 have the same weight or volume, the energy (Wh) of the high-capacity battery unit 22 is higher than that of the high-output battery unit 24. Thus, in charging, the high-capacity battery unit 22 has a wider energy (Wh) range between the lower limit of the SOC to the full charge than the high-output battery unit 24.

The high-capacity battery unit 22 is also configured to have a higher capacity density than the high-output battery unit 24. The capacity density can be expressed as, for example, capacity per unit weight (Ah/kg) of each battery unit and capacity per unit volume of each battery unit (Ah/$m^3$). In other words, when the high-capacity battery unit 22 and the high-output battery unit 24 have the same weight or volume, the power capacity (Ah) of the high-capacity battery unit 22 is higher than that of the high-output battery unit 24.

In contrast, the high-output battery unit 24 is configured to have a higher output power density than the high-capacity battery unit 22. The output power density can be expressed as, for example, output power per unit weight (W/kg) of each battery unit and output power per unit volume of each battery unit (W/$m^3$). In other words, when the high-output battery unit 24 and the high-capacity battery unit 22 have the same weight or volume, the high-output battery unit 24 has higher output power (W) than the high-capacity battery unit 22.

The output power density can also be expressed as electric current per unit area ($A/m^2$) of each battery unit. In other words, when the high-capacity battery unit 22 and the high-output battery unit 24 have the same area, the high-output battery unit 24 can allow larger electric current (A) than the high-capacity battery unit 22.

Based on such characteristics, the present embodiment sets a higher chargeable power from an external power supply to the high-capacity battery unit 22 than a chargeable power from an external power supply to the high-output battery unit 24. For example, the high-capacity battery unit 22 may be configured to be charged mainly by an external power supply, whereas the high-output battery unit 24 may be configured to be not chargeable from an external power supply, but chargeable only by electric power (regenerated or generated electric power) from the first and the second rotating electric machines MG1, MG2 (externally chargeable power=0). By charging the high-capacity battery unit 22 having the relatively high capacity (chargeable amount) using an external power supply, the charge power required from the rotating electric machines MG1, MG2 can be reduced.

As shown in FIG. 2, in the present embodiment, the high-capacity battery unit 22 is positioned nearer to the charging inlet 18 than the high-output battery unit 24 is to the charging inlet 18. In this way, because the wire length between the high-capacity battery unit 22 and the charging inlet 18 can be shortened, the increase in the power loss caused by a wiring resistance during external charging can be suppressed.

Further, in the present embodiment, the high-output battery unit 24 is positioned nearer to the rotating electric machines MG1, MG2 than the high-capacity battery unit 22 is to the rotating electric machines MG1, MG2. In this way, because the wire length between the high-output battery unit 24 and the first and the second rotating electric machines MG1, MG2 can be shortened, the increase in the power loss caused by a wiring resistance during internal charging can be suppressed.

In the present embodiment as an example of the arrangement described above, the elements are provided from the front to the rear side of the vehicle in the order of the first and the second rotating electric machines MG1, MG2, the high-output battery unit 24, the high-capacity battery unit 22, and the charging inlet 18.

Back in FIG. 2, the power control unit PCU is provided between the pair of the high-capacity battery unit 22 and the high-output battery unit 24 and the pair of the first rotating electric machines MG1 and MG2 such that the power control unit PCU performs buck/boost and DC-AC conversion of the electric power. The power control unit PCU includes a DC-DC converter which boosts DC power of the high-capacity battery unit 22 and the high-output battery unit 24, and an inverter which converts the boosted DC power to three-phase AC power. Three phase AC power regenerated or generated by the first and the second rotating electric machines MG1, MG2 is converted to DC power by the inverter, and then bucked by the DC/DC converter before being supplied to the high-capacity battery unit 22 and the high-output battery unit 24.

The first rotating electric machine MG1 generates power by being driven by the internal combustion engine 23. The generated power is supplied to the second rotating electric machine MG2, the high-capacity battery unit 22, and the high-output battery unit 24. To start the internal combustion engine 23 from a stopped state, electric power is supplied to the first rotating electric machine MG1 to crank the internal combustion engine 23. Because the electric power (kW) required for cranking is relatively high, electric power is supplied from the high-output battery unit 24 to the first rotating electric machine MG1.

In response to electric power supplied from the high-capacity battery unit 22 and the high-output battery unit 24, and additionally from the first rotating electric machine MG1 when the first rotating electric machine MG1 is being driven, the second rotating electric machine MG2 transmits drive power to the drive wheels of the electrically-driven vehicle 10. When the electrically-driven vehicle is in a braking operation, the second rotating electric machine MG2 performs regenerative braking. The electric power regenerated in the regenerative braking is supplied to the high-capacity battery unit 22 and the high-output battery unit 24.

The controller ECU is also called a "power management control computer". Based on signals from a sensor or the like provided with the electrically-driven vehicle 10, the controller ECU controls output of the internal combustion engine 23, and the first and the second rotating electric machines MG1, MG2. The controller ECU also controls ON/OFF operations of relays in the first and the second junction blocks 25, 27. The controller ECU further monitors the state of charge (SOC) of the high-capacity battery unit 22 and the high-output battery unit 24 to control electric power of these units. For example, the controller ECU may obtain electric currents and voltages of the high-capacity battery unit 22 and the high-output battery unit 24 using a sensor such as a current sensor and a voltage sensor (both not shown) so as to calculate or estimate the SOC of the battery units 22, 24 based on these obtained values. Because methods to calculate or estimate the SOC based on the current and voltage values are well-known, descriptions of the methods are omitted here.

The controller ECU controls electric power of the high-capacity battery unit 22 and the high-output battery unit 24 such that, regarding the electric power (Wh) supplied to the first and the second rotating electric machines MG1, MG2, the ratio of the electric power supplied from the high-capacity battery unit 22 is larger than the ratio of the electric power supplied from the high-output battery unit 24.

As an example of the electric power control, the controller ECU controls the electric power of the high-capacity battery unit 22 in a charge-depleting (CD) mode in which charged electric power is depleted. In the CD mode, the discharge from the high-capacity battery unit 22 is continued until the high-capacity battery unit 22 drops to the minimum SOC under which over-discharge occurs, causing deterioration.

Further, the controller ECU controls the electric power of the high-output battery unit 24 in a charge sustaining (CS) mode in which the SOC is attempted to be restored by switching to the HV mode before the charged electric power is completely depleted. In the CS mode, an EV/HV switching determination value is set higher than the lower limit of the SOC with a sufficient margin. The high-output battery unit 24 continues discharging until the SOC of the high-output battery unit 24 drops to the EV/HV switching determination value. Once the SOC of the high-output battery unit 24 reaches the EV/HV switching determination value, the controller ECU starts the internal combustion engine 23 to drive the first rotating electric machine MG1. The electric power generated by this drive is supplied to the high-output battery unit 24 so as to store the SOC of the high-output battery unit 24. After this, the electric power is controlled to avoid the SOC of the high-output battery unit 24 from dropping below the EV/HV switching determination value.

By setting the CD mode for the high-capacity battery unit 22 having a relatively high capacity (Ah) such that the charged electric power is used down to the lower limit of the SOC, but setting the CS mode for the high-output battery unit 24 having a lower capacity such that the SOC is maintained at some higher level, the dischargeable electric power (Wh) of the high-capacity battery unit 22 becomes higher than that of the high-output battery unit 24. As a result, in the electric power (Wh) supplied to the first and the second rotating electric machines MG1, MG2, the ratio of the electric power supplied from the high-capacity battery unit 22 becomes higher than from the high-output battery unit 24.

Further, as the discharged electric power is higher than the high-output battery unit 24, the high-capacity battery unit 22 obviously has higher chargeable electric power to be fully charged than the high-output battery unit 24. Based on these characteristics, the high-capacity battery unit 22 is mainly charged by an external power supply in the present embodiment. By externally charging the high-capacity battery unit 22 which requires a higher electric power to be charged, the charge load of the first and the second rotating electric machines MG1, MG2 can be reduced.

<Charging Operations>

Operations described below are performed to charge the high-capacity battery unit 22 and the high-output battery unit 24. First, an external charge is described. Prior to the external charge, the electrically-driven vehicle 10 enters into an ignition OFF state (for example, the controller ECU is OFF). On this occasion, the system main relay SMR1 and the charging relay CHR of the first junction block 25 and the system main relay SMR2 of the second junction block 27 are OFF.

In response to a connection of a charge cable to the charging inlet 18, the controller ECU is activated to turn ON the charging relay CHR of the first junction block 25 (the system main relays SMR1, SMR2 are maintained OFF). Electric power is supplied from an external power supply to the high-capacity battery unit 22 via the charging inlet 18, the battery charger 20, and the first junction block 25. The controller ECU monitors the recovery status of the SOC of the high-capacity battery unit 22 by obtaining current values and voltage values from a current sensor and a voltage sensor (both not shown). Further, when the high-capacity battery unit 22 is fully charged, the controller ECU turns OFF the charging relay CHR of the first junction block 25. The controller ECU shows that the high-capacity battery unit 22 is fully charged by an indicator or the like (not shown) (for example, by switching an indicator lamp from ON to OFF). Then, the controller ECU is turned OFF.

As described above, the high-output battery unit 24 is charged solely by the rotating electric machines MG1, MG2. When the ignition switch (not shown) is pressed to turn ON the controller ECU, the controller ECU turns ON the system main relay SMR1 of the first junction block 25 from an OFF state. The charging relay CHR of the first junction block 25 and the system main relay SMR2 of the second junction block 27 are maintained OFF. In response to the ON of the system main relay SMR1, electric power is supplied from the high-capacity battery unit 22 to the second rotating electric machine MG2, allowing the above described EV running of the electrically-driven vehicle 10.

When the running mode of the electrically-driven vehicle 10 is switched from the EV running mode to the above described HV mode, the internal combustion engine 23 is started, to use the first rotating electric machine MG1 for both driving and power generation. The controller ECU turns OFF the system main relay SMR1 of the first junction block 25 and turns ON the system main relay SMR2 of the second junction block 27. The charging relay CHR of the first junction block 25 is maintained OFF. In response to the ON of the system main relay SMR2 of the second junction block 27, generated electric power from the first rotating electric machine MG1 is supplied to the high-output battery unit 24 via the power control unit PCU and the second junction block 27.

When the high-output battery unit 24 is fully charged and the first rotating electric machine MG1 continues to be used for both driving and power generation, the electric power may be supplied from the first rotating electric machine MG1 to the high-capacity battery unit 22 by switching the system main relay SMR2 of the second junction block 27 from ON to OFF and switching the system main relay SMR1 of the first junction block 25 from OFF to ON.

<Second Embodiment>

Figure 6:
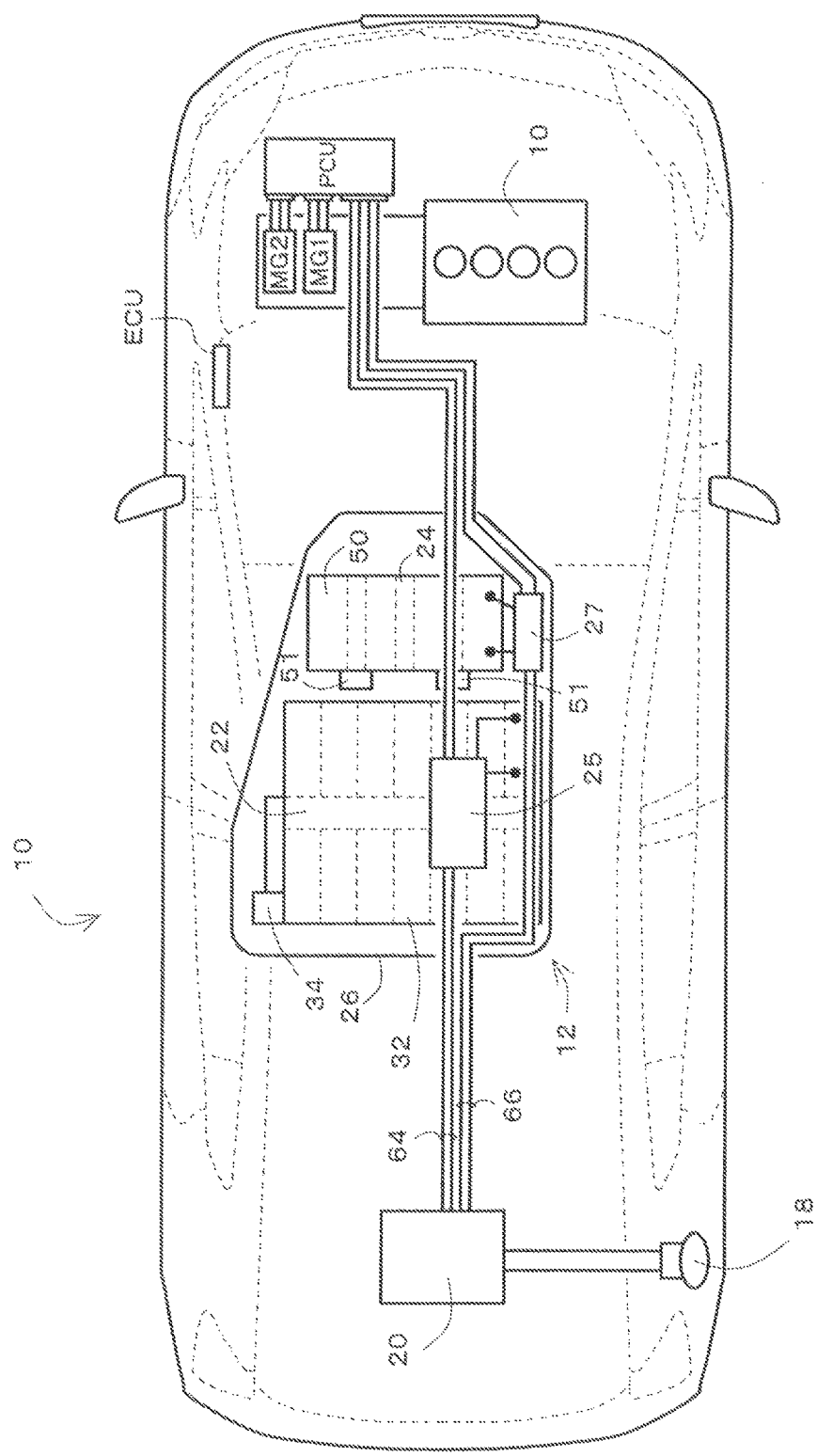
FIG. 6 shows an example of a plan view of an electrically-driven vehicle according to a second embodiment of the present invention.
Figure 7:
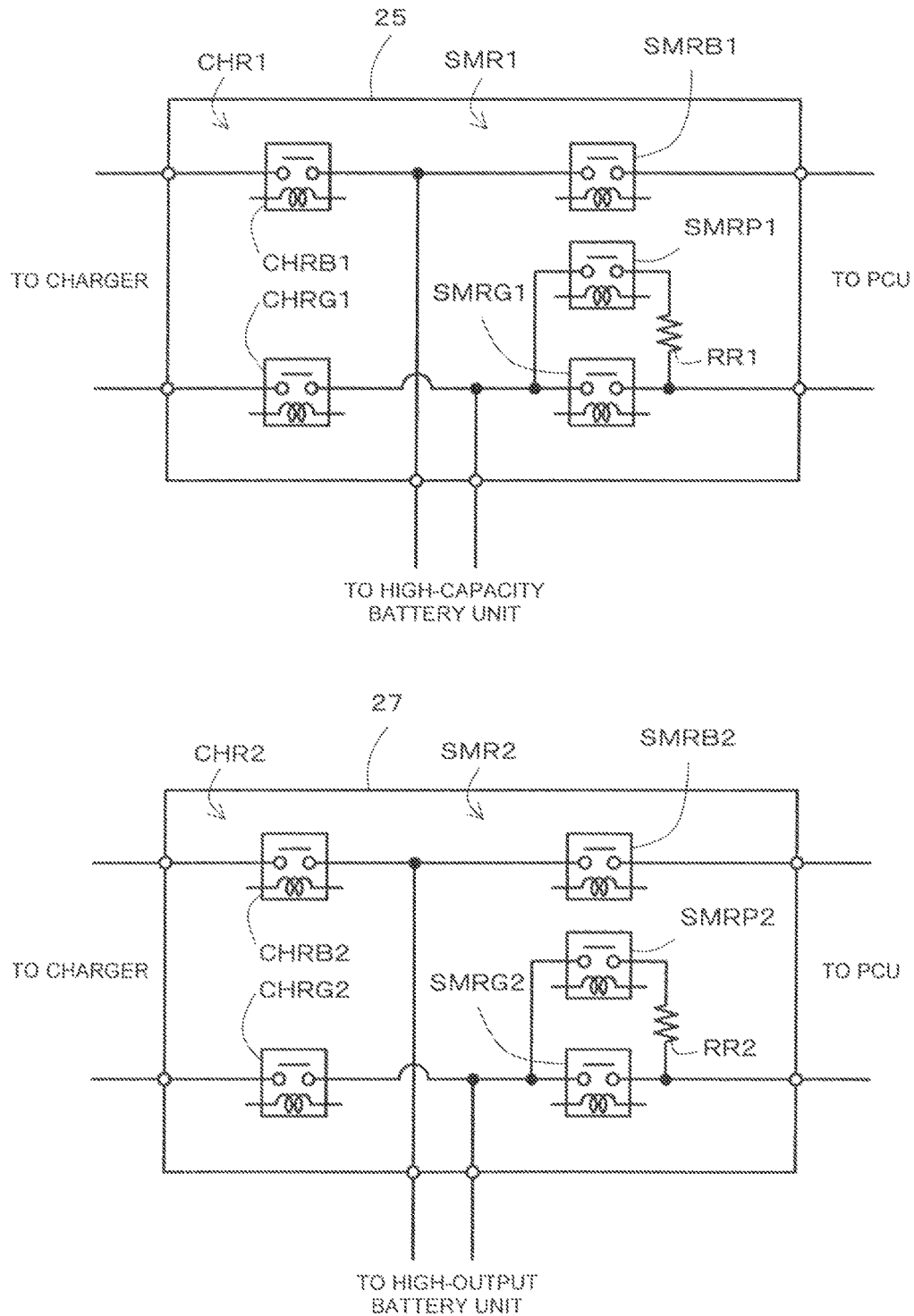
FIG. 7 shows examples of a first junction block and a second junction block which connect/disconnect each battery unit to/from a charging inlet and a power control unit according to the second embodiment of the present invention.

FIG. 6 shows a plan view of the electrically-driven vehicle 10 according to a second embodiment of the present invention. The electrically-driven vehicle 10 shown in FIG. 6 differs from the electrically-driven vehicle 10 shown in FIG. 2 in that, in addition to first wiring 64 (a pair of positive and negative wires) directly connecting the high-capacity battery unit 22 and the battery charger 20, a second wiring 66 (a pair of wires) are provided for directly connecting the high-output battery unit 24 and the battery charger 20. Further, as shown in FIG. 7, corresponding to this configuration, the second junction block 27 includes a system main relay SMR2 (a positive side relay SMRB2, a negative side relay SMRG2, a precharge relay SMRP2, and a resistor RR2) and a charging relay CHR2 (a positive side relay CHRB2 and a negative side relay CHRG2).

Further, the first wiring 64 is arranged to have a shorter length than the second wiring 66. More specifically, while the wiring between the charging inlet 18 and the battery charger 20 is commonly used, the wiring between the battery charger 20 and the first junction block 25 is arranged to be shorter than the wiring between the battery charger 20 and the second junction block 27.

In this second embodiment, the high-capacity battery unit 22 is also configured to receive more charge power from an external power supply than the high-output battery unit 24 receives. For example, in externally charging both of the battery units, the controller ECU controls electric power of each battery unit such that the charge power [Wh] required to fully charge the high-capacity battery unit 22 before the external charge is higher than the charge power [Wh] required to fully charge the high-output battery unit 24.

As described above, the electric power of the high-capacity battery unit 22 is controlled in the CD mode in which the charged power is depleted down to the lower limit, while the electric power of the high-output battery unit 24 is controlled in the CS mode in which the SOC is maintained at a certain higher level. Because of this difference in the electric power control mode, the SOC of the high-capacity battery unit 22 becomes lower than the high-output battery unit 24 when the external charge starts after driving of the electrically-driven vehicle 10. Because the SOC of the high-capacity battery unit 22 having a higher capacity (Ah) becomes lower than that of the high-output battery unit 24 having a lower capacity, the electric power (Wh) required to fully charge the high-capacity battery unit 22 is higher than the electric power required to fully charge the high-output battery unit 24. By arranging the first wiring 64 connecting the high-capacity battery unit 22 requiring higher electric power to be fully charged and the charging inlet 18 to be shorter than the second wiring 66 connecting the high-output battery unit 24 and the charging inlet 18, the electric power loss increase caused by the external charge can be suppressed.

During external charging, for example, the operations described below are performed. At the start of the external charge, the charging relays CHR1, CHR2 of the first and second junction blocks 25, 27 are switched from OFF to ON to start charging of the high-capacity battery unit 22 and the high-output battery unit 24 (with the system main relays SMR1, SMR2 maintained OFF). The controller ECU calculates the recovery status of the SOC of each of the battery units 22, 24 by monitoring electric current and voltage of the battery units 22, 24 obtained from an electric current sensor or a voltage sensor (both not shown). After a certain period of time, the high-output battery unit 24 is firstly fully charged and the charging relay CHR2 is turned OFF. Then, the high-capacity battery unit 22 is fully charged and the charging relay CHR1 is turned OFF. Regarding charging with the electrically-driven vehicle 10 in the HV running mode, the above described control is performed (the charging relays CHR1, CHR2 are both maintained OFF.)

It should be noted that the present invention is not limited to the embodiments described above, and does include all variations and modifications which do not depart from the technical scope and the essence of the present invention defined in the claims.

The invention claimed is:

1. An electrically-driven vehicle comprising:
a rotating electric machine configured to drive the vehicle;
a high-capacity battery unit configured to have a relatively high capacity and a high-output battery unit configured to have a relatively high output, the high-capacity battery unit having a higher capacity and a lower output than the high-output battery unit, both the high-capacity battery unit and the high output battery unit supplying electric power to the rotating electric machine; and
a charging inlet configured to serve as a charging port of an external power supply, the charging inlet being connected to the high-capacity battery unit via first power wiring and to the high-output battery unit via second power wiring, the first power wiring being shorter than the second power wiring, wherein
the rotating electric machine is connected to the high-capacity battery unit via a third power wiring and to the high-output battery unit via a fourth power wiring, and
the fourth power wiring is shorter than the third power wiring.

2. The electrically-driven vehicle according to claim 1, wherein
among the electric power supplied to the rotating electric machine, a ratio of the electric power supplied from the high-capacity battery unit to the rotating electric machine is configured to be higher than a ratio of the electric power supplied from the high-output battery unit to the rotating electric machine.

* * * * *